(12) United States Patent
Yamamoto (10) Patent No.: US 8,687,222 B2
(45) Date of Patent: Apr. 1, 2014

(54) IMAGE DATA BUFFER APPARATUS AND DATA TRANSFER SYSTEM FOR EFFICIENT DATA TRANSFER

(75) Inventor: Yoshinobu Yamamoto, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1361 days.

(21) Appl. No.: 11/651,968

(22) Filed: Jan. 11, 2007

(65) Prior Publication Data

US 2008/0049240 A1 Feb. 28, 2008

(30) Foreign Application Priority Data

Aug. 28, 2006 (JP) ................................ 2006-230977

(51) Int. Cl.
*G06F 3/12* (2006.01)
*G06F 5/00* (2006.01)

(52) U.S. Cl.
USPC .......................................... 358/1.16; 710/52

(58) Field of Classification Search
USPC ...................... 358/1.15, 1.16, 518
See application file for complete search history.

(56) References Cited

U.S. PATENT DOCUMENTS

| | | | |
|---|---|---|---|
| 4,285,038 A | 8/1981 | Suzuki et al. | |
| 4,839,791 A | 6/1989 | Ito | |
| 5,515,330 A * | 5/1996 | Hattori et al. | 365/221 |
| 5,977,947 A * | 11/1999 | Potu | 345/660 |
| 6,771,271 B2 * | 8/2004 | Ning et al. | 345/537 |
| 2001/0054121 A1 * | 12/2001 | Proch et al. | 710/57 |
| 2005/0069214 A1 * | 3/2005 | Hayashi | 382/251 |

FOREIGN PATENT DOCUMENTS

| | | |
|---|---|---|
| EP | 0 489 504 A2 | 6/1992 |
| FR | 2 606 187 A1 | 5/1988 |
| JP | 8-9385 | 1/1996 |
| JP | 2002-142149 A | 5/2002 |
| JP | 2005-530246 | 10/2005 |
| WO | WO 01/54414 A1 | 7/2001 |

OTHER PUBLICATIONS

Japanese Office Action with English Translation mailed on Apr. 5, 2011 issued with respect to the Japanese Patent Application No. 2006-230977.

* cited by examiner

*Primary Examiner* — Benny Q Tieu
*Assistant Examiner* — Sunil Chacko
(74) *Attorney, Agent, or Firm* — Arent Fox LLP (57) ABSTRACT

An image data buffer apparatus includes a memory, and a FIFO control unit configured to cause the memory to operate as a FIFO and having a write pointer indicative of a write position of the memory and a read pointer indicative of a read position of the memory, wherein the FIFO control unit is configured to store image data as a plurality of blocks in the memory at respective positions successively indicated by the write pointer as the image data are supplied as the blocks contained in an image, to read one of the blocks from the memory at a position indicated by the read pointer, to read, from the memory, partial data that is part of at least one block adjacent to the one of the blocks, and to consolidate the one of the blocks and the partial data for transmission as one consolidated block.

10 Claims, 9 Drawing Sheets

|  | POSITION | WP | RP | AVL | FULL | RDY | EMP |
|---|---|---|---|---|---|---|---|
| RESET | — | 0 | 0 | 0 | 0 | 0 | 1 |
| WRx4 | LEFT END | 4 | 0 | 4 | 1 | 1 | 0 |
| RDx1 | MIDDLE | 4 | 1 | 3 | 1 | 1 | 0 |
| RDx1 | RIGHT END | 4 | 2 | 2 | 0 | 1 | 0 |
| WRx1 | RIGHT END | 5 | 2 | 3 | 1 | 1 | 0 |
| RDx1 | LEFT END | 5 | 3 | 2 | 0 | 1 | 0 |
| WRx2 | LEFT END | 7 | 3 | 4 | 1 | 1 | 0 |

IMAGE DATA BUFFER APPARATUS AND DATA TRANSFER SYSTEM FOR EFFICIENT DATA TRANSFER

CROSS-REFERENCE TO RELATED APPLICATIONS

The present application is based upon and claims the benefit of priority from the prior Japanese Patent Application No. 2006-230977 filed on Aug. 28, 2006, with the Japanese Patent Office, the entire contents of which are incorporated herein by reference.

BACKGROUND OF THE INVENTION

1. Field of the Invention

The present invention generally relates to image data buffer apparatuses and image transfer processing systems, and particularly relates to an image data buffer apparatus and image transfer processing system that transfer image data in units of blocks.

2. Description of the Related Art

In the field of image processing, image data is often divided into a plurality of blocks, and processing such as filtering or compression coding is performed in units of blocks. When filtering is performed with respect to a given block, data of surrounding pixels outside the block boundary needs to be referred to in order to obtain the filtered values of pixels positioned close to the block boundary. If the size of one block is n-by-m pixels, for example, computation-purpose image data of the size corresponding to the filter size is attached to the exterior of the n-by-m pixels, thereby providing image data of s-by-t (s>n and t>m) pixels. An obtained image block of the s-by-t pixels, which has larger size than the original block size, is then supplied one by one from an image data buffer to an image processing unit.

Figure 1:
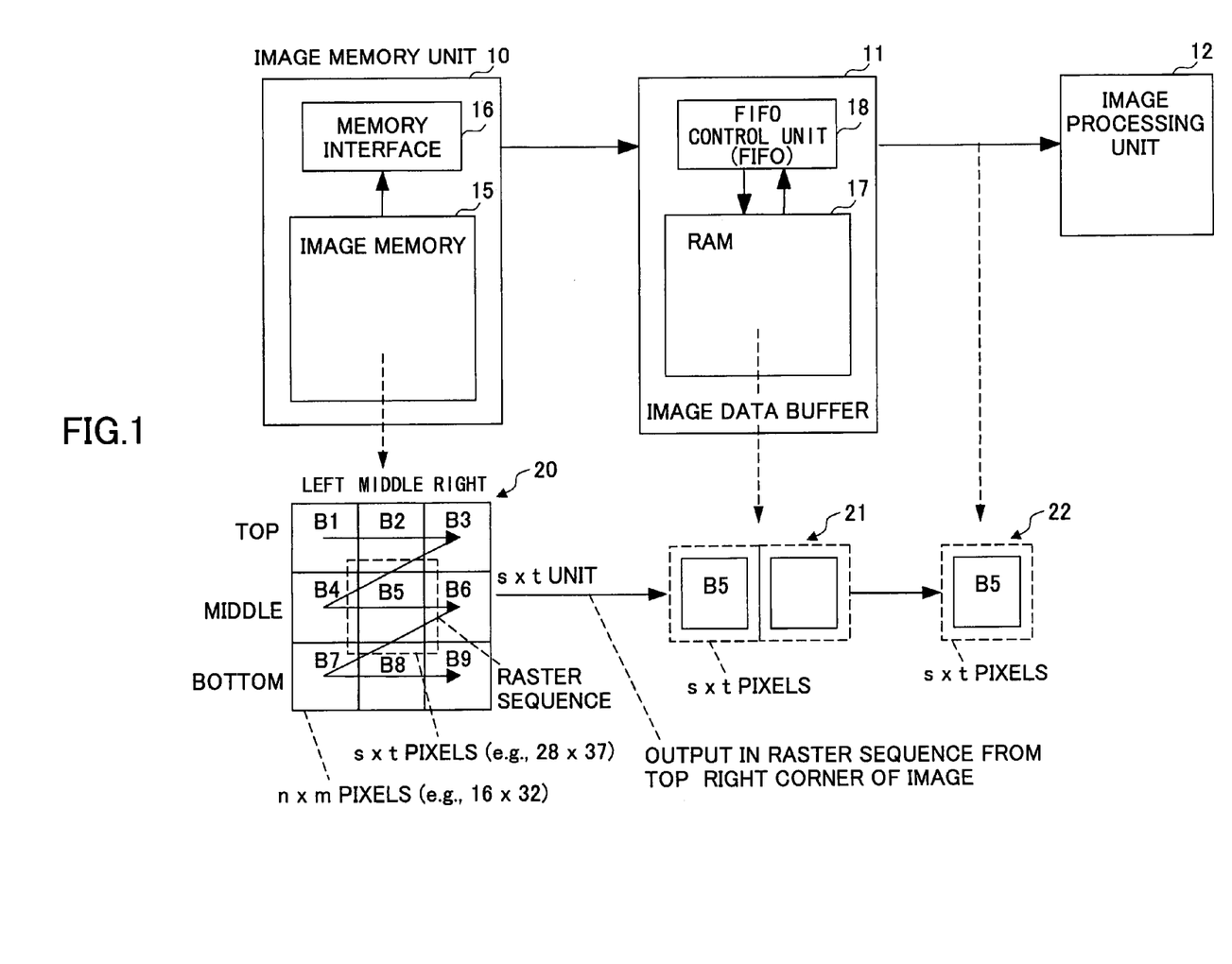
FIG. 1 is a drawing showing an example of the configuration of a related-art image transfer/processing system.

FIG. 1 is a drawing showing an example of the configuration of a related-art image transfer/processing system. The image transfer/processing system of FIG. 1 includes an image memory unit 10, an image data buffer 11, and an image processing unit 12. The image memory unit 10 includes an image memory 15 and a memory interface 16 for controlling the inputting/outputting of data and the like with respect to the image memory 15. The image data buffer 11 includes a RAM 17 and a FIFO control unit 18 for controlling the inputting/outputting of data and the like with respect to the RAM 17. The FIFO control unit 18 performs a FIFO (first-in first-out) operation by controlling the write pointer indicative of a write position and the read pointer indicative of a read position with respect to the RAM 17.

The memory interface 16 of the image memory unit 10 stores image data of 3×3 blocks, for example, as shown as image data 20. In this example, the image data 20 is comprised of 9 blocks B1 through B9, each of which is comprised of n×m pixels (e.g., 16×32 pixels).

The memory interface 16 reads the block data from the image memory 15 in the order of B1 through B9 (i.e., in the raster-scan order), and supplies the block data sequentially to the image data buffer 11. When the memory interface 16 reads the block B5, for example, it also reads the data of surrounding pixels on the left, right, top, and bottom at the same time so as to read image data of s×t (e.g., 28×37) pixels larger than n×m pixel data, and supplies the read data as image data corresponding to the block B5 to the image data buffer 11. Data of individual pixels contained in the image data of s×t pixels are successively supplied in the raster-scan order.

The image data of s×t pixels supplied in this manner is then written by the FIFO control unit 18 to the RAM 17 in the image data buffer 11. In this example, the RAM 17 serves as a FIFO for storing data for two blocks, and is controlled by the FIFO control unit 18. As shown in FIG. 1, the RAM 17 stores, as image data 21, image data of s×t pixels corresponding to the block B5 and image data of s×t pixels corresponding to the next block.

The FIFO control unit 18 of the image data buffer 11 first reads the block image data that was written first, and supplies it from the RAM 17 to the image processing unit 12. As shown in FIG. 1, image data 22 of s×t pixels corresponding to the block B5, for example, is supplied from the image data buffer 11 to the image processing unit 12. The image processing unit 12 performs image processing inclusive of filtering with respect to the image data 22 of s×t pixels supplied thereto.

Figure 2:
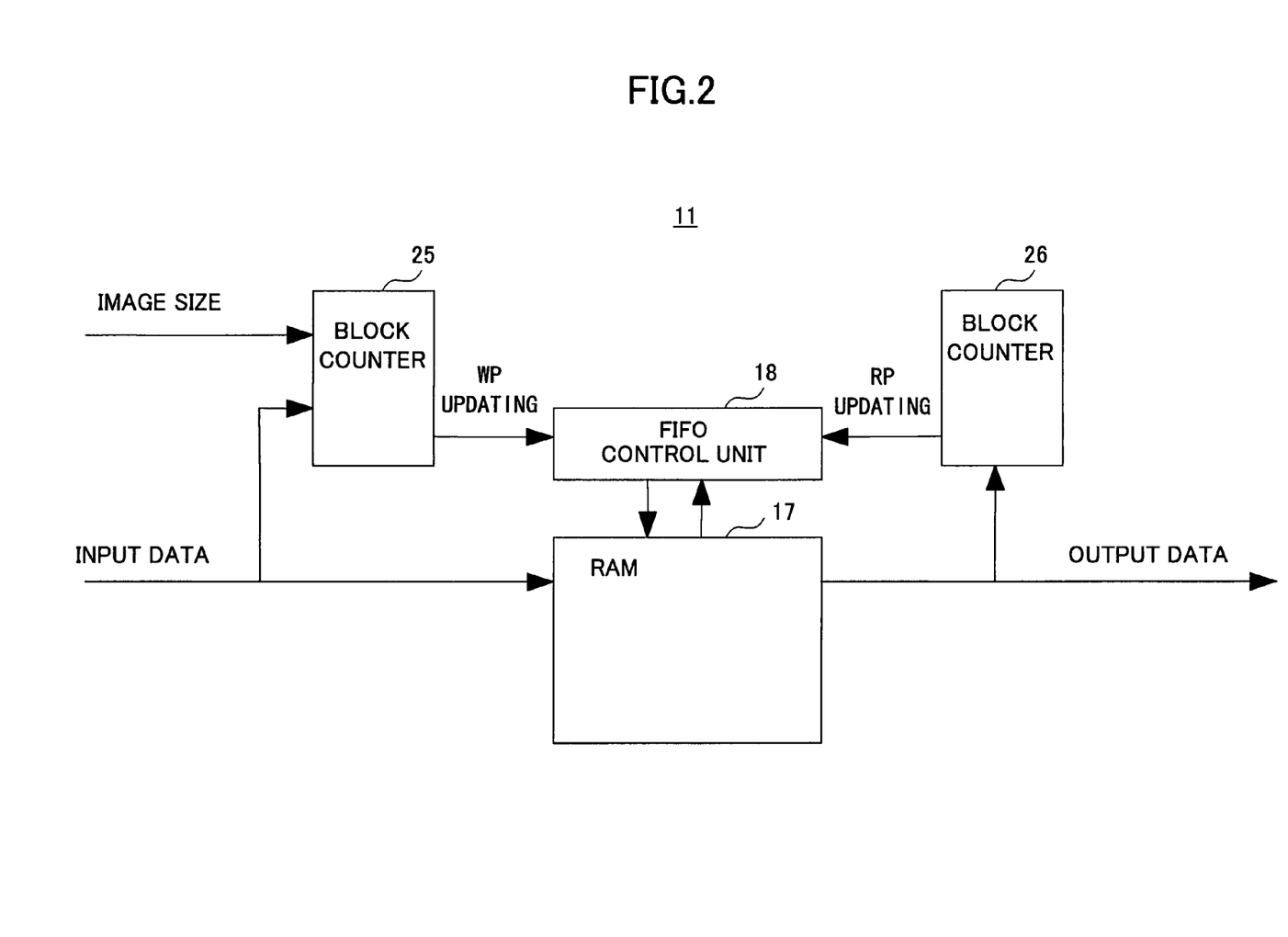
FIG. 2 is a drawing showing an example of the detailed configuration of an image data buffer.

FIG. 2 is a drawing showing an example of the detailed configuration of the image data buffer 11. The image data buffer 11 shown in FIG. 2 includes the RAM 17, the FIFO control unit 18, a block counter 25, and a block counter 26. The RAM 17 receives image data from the image memory unit 10 as input data. The input data is written to the RAM 17 at the address indicated by a write pointer WP controlled by the FIFO control unit 18. The input data from the image memory unit 10 is concurrently supplied to the block counter 25.

The block counter 25 also receives information about the size of image data corresponding to one block. The block counter 25 counts the number of bits of input data, and compares its count with the image size so as to determine whether the image data for one block has been supplied. Each time image data for one block is supplied, the block counter 25 supplies a signal requesting the updating of the write pointer WP to the FIFO control unit 18. In response to this signal, the FIFO control unit 18 updates the write pointer WP (i.e., updates the write pointer WP to a pointer value indicative of the write position of the next block).

Output data is read from the RAM 17 at the address indicated by a read pointer RP controlled by the FIFO control unit 18, and is then supplied to the image processing unit 12. This output data is also supplied to the block counter 26.

The block counter 26 also receives information about the size of image data corresponding to one block (not shown). The block counter 26 counts the number of bits of the output data, and compares its count with the image size so as to determine whether the image data for one block has been output. Each time image data for one block is output, the block counter 26 supplies a signal requesting the updating of the read pointer RP to the FIFO control unit 18. In response to this signal, the FIFO control unit 18 updates the read pointer RP (i.e., updates the read pointer RP to a pointer value indicative of the read position of the next block).

With the configuration as shown in FIG. 1 and FIG. 2, image data of s×t (s>n and t>m) pixels larger than the block size when the size of one block is n×m pixels is prepared and supplied from the image data buffer 11 to the image processing unit 12. In such configuration, however, the amount of data transfer from the image memory 15 increases since data of s×t pixels, in stead of n×m pixels, is read from the image memory 15 for each block. Moreover, the computation-purpose image data provided in the perimeter of image data of s×t pixels are read twice at minimum and four times at the maximum, which means that this data transfer is extremely inefficient. In a configuration in which another apparatus also accesses the image memory 15, such increase in the amount of data transfer is not desirable because it directly leads to a performance drop.

[Patent Document 1] Japanese Patent Application Publication No. 8-9385

[Patent Document 2] Japanese Patent Application Publication No. 2002-142149

Accordingly, there is a need for an image data buffer apparatus and image transfer processing system that can efficiently read data from an image memory in the configuration in which image data is transferred from the image memory to an image processing apparatus via an image data buffer on a block-by-block basis.

SUMMARY OF THE INVENTION

It is a general object of the present invention to provide an image data buffer apparatus and image transfer processing system that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an image data buffer apparatus and image transfer processing system particularly pointed out in the specification in such full, clear, concise, and exact terms as to enable a person having ordinary skill in the art to practice the invention.

To achieve these and other advantages in accordance with the purpose of the invention, the invention provides an image data buffer apparatus, which includes a memory and a FIFO control unit configured to cause the memory to operate as a FIFO and having a write pointer indicative of a write position of the memory and a read pointer indicative of a read position of the memory, wherein the FIFO control unit is configured to store image data as a plurality of blocks in the memory at respective positions successively indicated by the write pointer as the image data are supplied as the plurality of blocks contained in an image, to read one of the plurality of blocks from the memory at a position indicated by the read pointer, to read, from the memory, partial data that is part of at least one block adjacent to the one of the plurality of blocks, and to consolidate the one of the plurality of blocks and the partial data for transmission as one consolidated block.

According to another aspect of the present invention, an image transfer/processing system includes a memory, a FIFO control unit configured to cause the memory to operate as a FIFO and having a write pointer indicative of a write position of the memory and a read pointer indicative of a read position of the memory, and an image processing unit, wherein the FIFO control unit is configured to store image data as a plurality of blocks in the memory at respective positions successively indicated by the write pointer as the image data are supplied as the plurality of blocks contained in an image, to read one of the plurality of blocks from the memory at a position indicated by the read pointer, to read, from the memory, partial data that is part of at least one block adjacent to the one of the plurality of blocks, and to consolidate the one of the plurality of blocks and the partial data for transmission to the image processing unit as one consolidated block.

According to at least one embodiment of the present invention, the duplicate transfer of the same data is avoided as much as possible during data transfer from the image memory to the FIFO, thereby providing an advantage in that the amount of data transfer is reduced. When compared with the conventional configuration having the same number of FIFO stages, the amount of image data is smaller in at least one embodiment of the present invention, so that the size of the FIFO can be reduced.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 3:
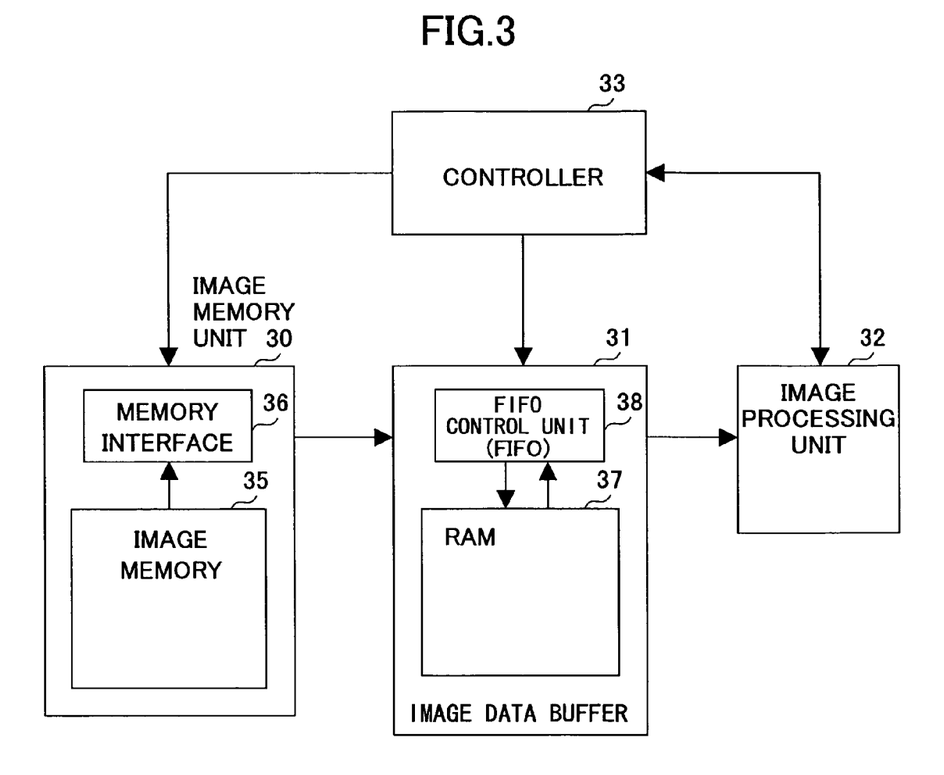
FIG. 3 is a drawing showing an example of the configuration of an image transfer/processing system according to the present invention.

FIG. 3 is a drawing showing an example of the configuration of an image transfer/processing system according to the present invention. The image transfer/processing system of FIG. 3 includes an image memory unit 30, an image data buffer 31, an image processing unit 32, and a controller 33. The image memory unit 30 includes an image memory 35 and a memory interface 36 for controlling the inputting/outputting of data and the like with respect to the image memory 35. The image data buffer 31 includes a RAM 37 and a FIFO control unit 38 for controlling the inputting/outputting of data and the like with respect to the RAM 37. The FIFO control unit 38 performs a FIFO (first-in first-out) operation by controlling the write pointer indicative of a write position and the read pointer indicative of a read position with respect to the RAM 37. The controller 33 returns an acknowledge in response to a processing data request from the image processing unit 32, and controls the image memory unit 30 and the image data buffer 31 to achieve data transfer from the image memory unit 30 to the image data buffer 31 and data transfer from the image data buffer 31 to the image processing unit 32. The position at which the controller 33 is provided is not limited to a particular position, and the function of the controller 33 may be provided inside the image data buffer 31 as an interface unit.

Figure 4:
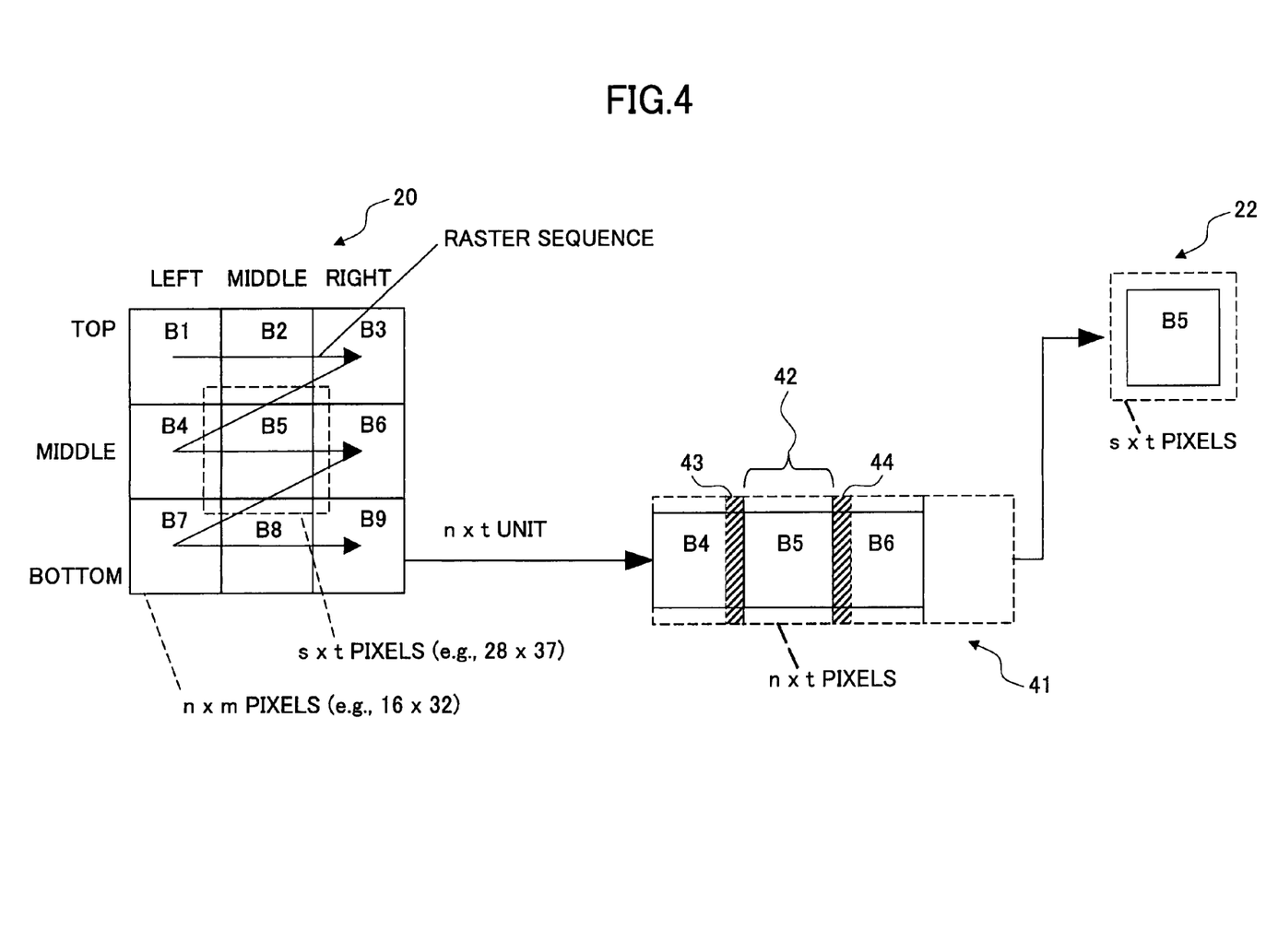
FIG. 4 is a drawing for explaining the operation principle of the image transfer/processing system shown in FIG. 3.

FIG. 4 is a drawing for explaining the operation principle of the image transfer/processing system shown in FIG. 3. The operation of the image transfer/processing system shown in FIG. 3 will be described by referring to FIG. 3 and FIG. 4.

The memory interface 36 of the image memory unit 30 stores image data of 3×3 blocks, for example, as shown as image data 20 in FIG. 4. In this example, the image data 20 is comprised of 9 blocks B1 through B9, each of which is comprised of n×m pixels (e.g., 16 pixels in width and 32 pixels in height).

The memory interface 36 reads the block data from the image memory 35 in the order of B1 through B9 (i.e., in the raster-scan order), and supplies the block data sequentially to the image data buffer 31. When the memory interface 36 reads the block B5, for example, it concurrently reads the data of surrounding pixels on the top and bottom only so as to read image data of n×t pixels (e.g., 16 pixels in width and 37 pixels in height) larger only in the vertical direction (sub-scan direction) than n×m pixel data, and supplies the read data as image data corresponding to the block B5 to the image data buffer 31. Data of individual pixels contained in the image data of n×t pixels are successively supplied in the raster-scan order.

The image data of n×t pixels supplied in this manner is then written by the FIFO control unit 38 to the RAM 37 in the image data buffer 31. In this example, the RAM 37 serves as a FIFO for storing data for four blocks, and is controlled by the FIFO control unit 38. As shown in FIG. 4, the RAM 37 stores, as image data 41, image data of n×t pixels corresponding to the block B5, image data of n×t pixels corresponding to the preceding block, and image data of n×t pixels corresponding to the next block.

The FIFO control unit 38 of the image data buffer 31 first reads the block image data that was written first, and supplies it from the RAM 37 to the image processing unit 32. In so doing, the FIFO control unit 38 attaches computation-purpose image data to the left and right of the image data of n×t pixels that is being output so as to generate image data of s×t pixels for provision to the image processing unit 32. The image data of s×t pixels is shown as the image data 22 in FIG. 4. As will be described in the following, the blocks positioned at the left edge or right edge of the complete image has the data size equal to $(n+(s-n)/2) \times t$ that is supplied to the image processing unit 32.

In the case of the block B5, for example, it is positioned in the middle of the three blocks B4 through B6 that are arranged in the horizontal direction, so that image data 42 of n×t pixels corresponding to the block B5, partial data 43 of the right-hand edge portion of the adjacent block B4 situated on the left, and partial data 44 of the left-hand edge portion of the adjacent block B6 on the right are consolidated as image data of s×t pixels, which is read from the RAM 37. In this manner, computation-purpose data is attached to the left and right of the block B5.

In the case of the block B4, for example, it is positioned on the left of the three blocks B4 through B6 that are arranged in the horizontal direction, so that image data of n×t pixels corresponding to the block B4 and partial data of the left-hand edge portion of the adjacent block B5 on the right are consolidated, thereby attaching computation-purpose data on the right-hand side of the block B4. No computation-purpose data is attached on the left-hand side of the block B4. With this arrangement, image data of $(n+(s-n)/2) \times t$ pixels is supplied to the image processing unit 32 from the RAM 37.

In the case of the block B6, by the same token, it is positioned on the right of the three blocks B4 through B6 that are arranged in the horizontal direction, so that image data of n×t pixels corresponding to the block B6 and partial data of the right-hand edge portion of the adjacent block B5 on the left are consolidated, thereby attaching computation-purpose data on the left-hand side of the block B6. No computation-purpose data is attached on the right-hand side of the block B6. With this arrangement, image data of $(n+(s-n)/2) \times t$ pixels is supplied to the image processing unit 32 from the RAM 37.

When the memory interface 36 reads image data from the image memory 35, provision may be made such that computation-purpose data is attached only to the bottom of each block with respect to the blocks B1 through B3 situated along the top edge of the image. By the same token, computation-purpose data may be attached only to the top of each block with respect to the blocks B7 through B9 situated along the bottom edge of the image.

Figure 5:
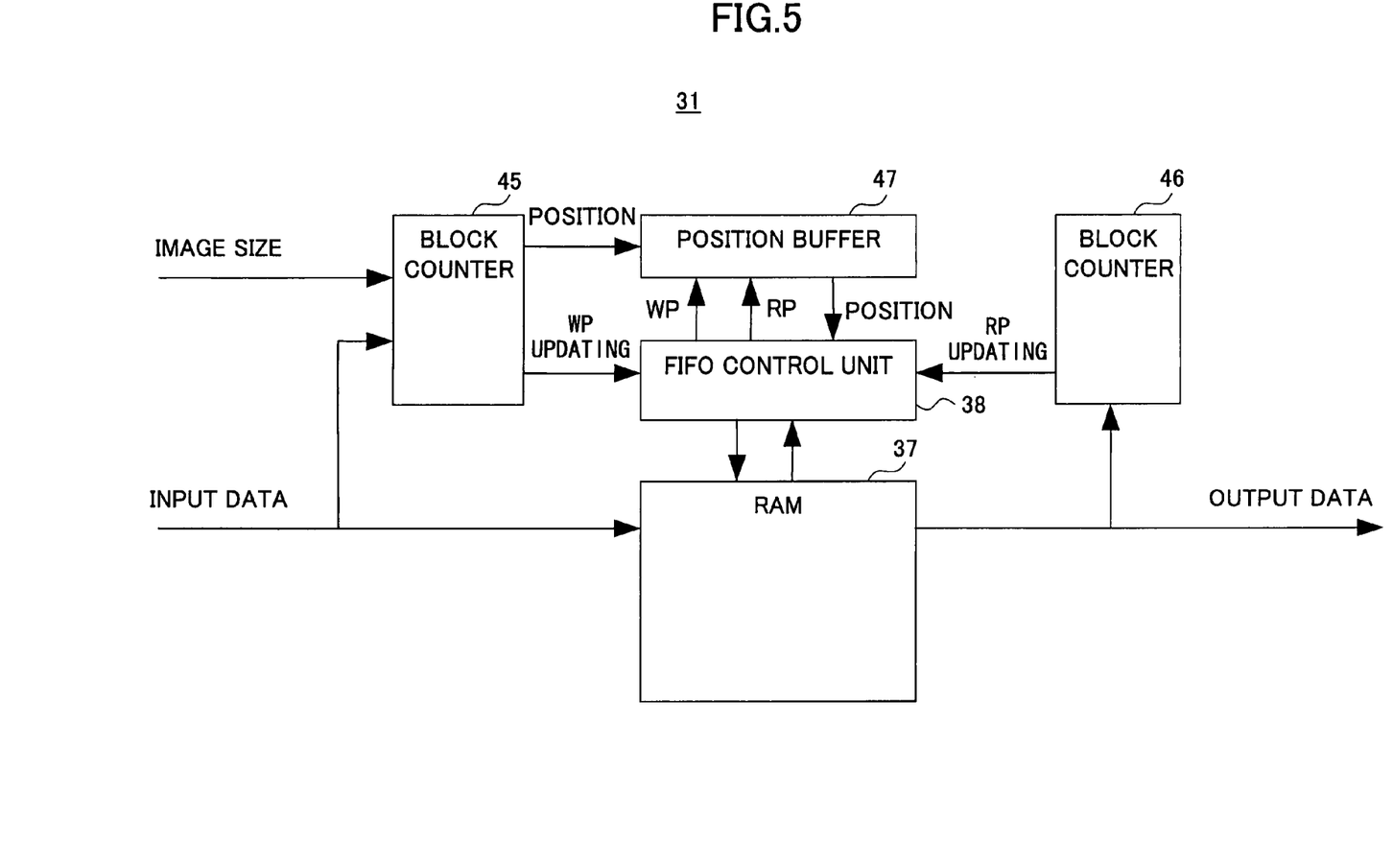
FIG. 5 is a drawing showing an example of the detailed configuration of an image data buffer.

FIG. 5 is a drawing showing an example of the detailed configuration of the image data buffer 31. The image data buffer 31 shown in FIG. 5 includes the RAM 37, the FIFO control unit 38, a block counter 45, a block counter 46, and a position buffer 47. The RAM 37 receives image data from the image memory unit 30 as input data. The input data is written to the RAM 37 at the address indicated by a write pointer WP controlled by the FIFO control unit 38. The input data from the image memory unit 30 is concurrently supplied to the block counter 45.

The block counter 45 also receives information about the size of image data corresponding to one block. The block counter 45 counts the number of bits of input data, and compares its count with the image size so as to determine whether the image data for one block has been supplied. Each time image data for one block is supplied, the block counter 25 supplies a signal requesting the updating of the write pointer WP to the FIFO control unit 38. In response to this signal, the FIFO control unit 38 updates the write pointer WP (i.e., updates the write pointer WP to a pointer value indicative of the write position of the next block).

Further, the block counter 45 supplies, to the position buffer 47, information (position information) about the position of the block for which the input data is currently supplied. The information about the position of a block may be data that indicates "left", "middle", or "right". "Left" means that the block of interest is the leftmost one of the plurality of blocks arranged horizontally in line. "Middle" means that the block of interest is a middle one that is not situated at either end of the plurality of blocks arranged horizontally in line. "Right" means that the block of interest is the rightmost one of the plurality of blocks arranged horizontally in line. To be specific, in the example of the image data 20 shown in FIG. 4, the blocks B1, B4, and B7 are categorized as "left", the blocks B2, B5, and B8 categorized as "middle", and the blocks B3, B6, and B9 categorized as "right".

Since the block counter 45 receives as its input information the information about the image size of "left", "middle", and "right" blocks, the block counter 45 is able to identify the position of the block for which the input data is currently supplied by counting the number of bits of input data and comparing its count with the image size. The block counter 45 supplies the information (position information) about the identified block position to the position buffer 47. The position buffer 47 stores the position information supplied from the block counter 45 at the location indicated by the write pointer WP supplied from the FIFO control unit 38. With this provision, the position buffer 47 can record the information (position information) about the position of a block for each block that is stored in the FIFO.

The position buffer 47 supplies to the FIFO control unit 38 the position information stored at the position indicated by the read pointer RP supplied from the FIFO control unit 38. With this arrangement, the FIFO control unit 38 can learn the position information of the block indicated by the read pointer RP. Based on this position information, the FIFO control unit 38 determines whether to attach partial data to both the left-hand side and the right-hand side, attach partial data only to the right-hand side, or attach partial data only to the left-hand side at the time of a data read operation.

Output data is read from the RAM 37 at the address indicated by the read pointer RP controlled by the FIFO control unit 38, and is then supplied to the image processing unit 32. This output data is also supplied to the block counter 46.

The block counter 46 also receives the position information of the read block and the information about the size of image data corresponding to one block (not shown). The block counter 46 counts the number of bits of the output data, and compares its count with the image size so as to determine whether the image data for one block has been output. Each time image data for one block is output, the block counter 46 supplies a signal requesting the updating of the read pointer RP to the FIFO control unit 38. In response to this signal, the FIFO control unit 38 updates the read pointer RP (i.e., updates the read pointer RP to a pointer value indicative of the read position of the next block).

Figure 6:
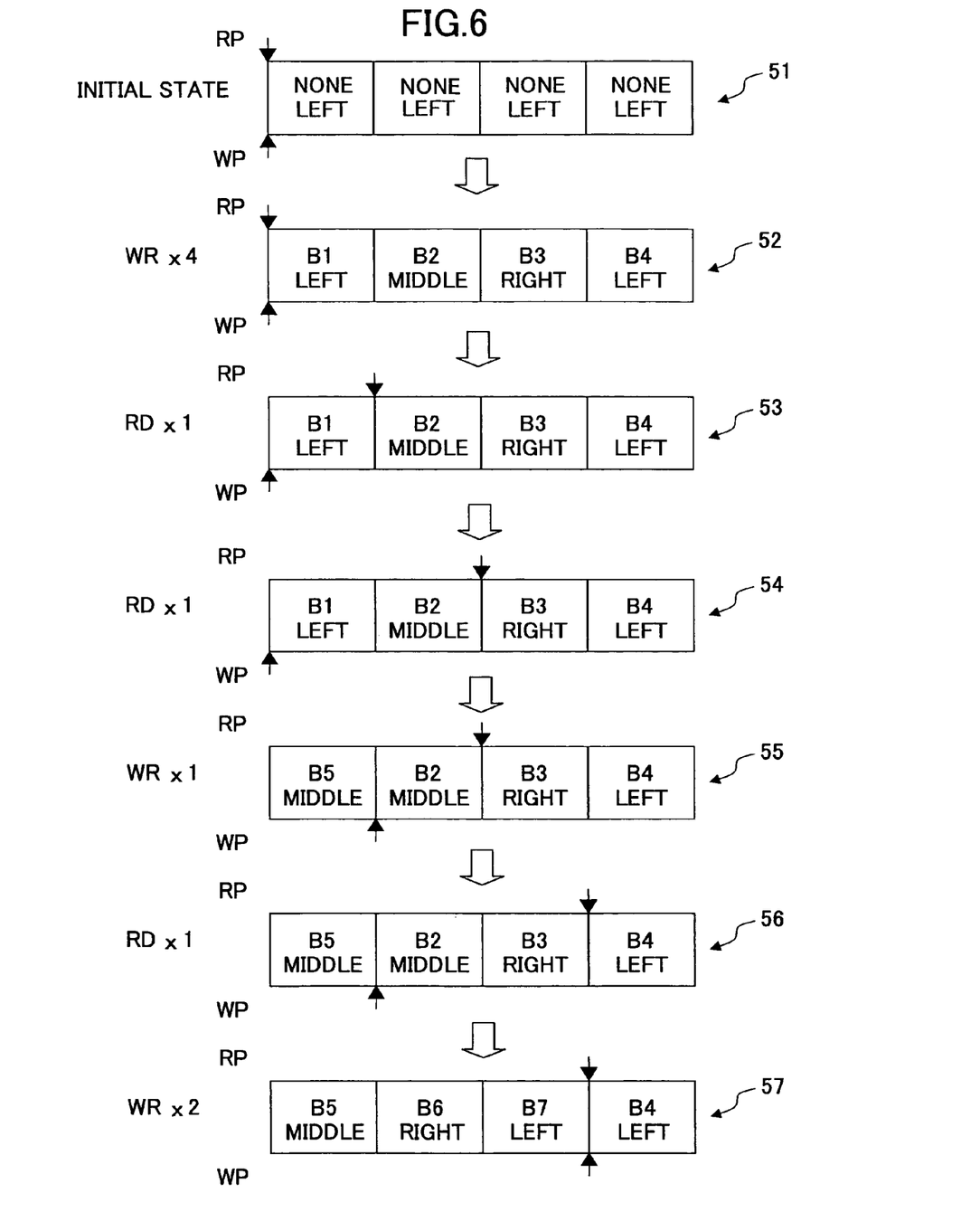
FIG. 6 is a drawing showing an example of the contents of a FIFO and a position buffer when block data are stored in a four-stage FIFO.

FIG. 6 is a drawing showing an example of the contents of the FIFO and the position buffer 47 when block data are stored in a four-stage FIFO.

The four-stage FIFO is implemented by the writing/reading of data to/from the RAM 37 under the control of the FIFO control unit 38. In the initial state, the contents of the FIFO and the contents of the position buffer 47 are shown as buffer data 51. The four rectangle frames of the buffer data 51 indicate the four block storage positions provided in the four-stage FIFO. In each illustrated rectangle frame, a symbol provided on the upper side indicates the block that is stored, and a symbol provided on the lower side indicates the block-specific position information that is stored in the position buffer 47. In the initial state, there is no stored block, and all the position information has the initial setting "left". The symbol "RP" and the associated arrow in FIG. 6 represent the position indicated by the read pointer RP, and the symbol "WP" and the associated arrow represent the position indicated by the write pointer WP.

When a write operation is performed four times (WR×4), the contents of the FIFO and the contents of the position buffer 47 become what is shown as buffer data 52. Namely, the FIFO stores the blocks B1 through B4, and the position buffer 47 stores "left", "middle", "right", and "left". Both the read pointer RP and the write pointer WP indicate the first (leftmost) store position.

In this state, the block B1 that was written first is read (RD×1), resulting in the position indicated by the read pointer RP being the second (second from the left) store position. At this time, the contents of the FIFO and the contents of the position buffer 47 are shown as buffer data 53.

In a normal FIFO operation, no problem would arise by overwriting the block B1 with a next block to be written (i.e., B5 in this example) immediately after the reading of the block B1. In the present invention, however, the block B1 cannot be erased immediately after the reading of the block B1. The reason for this is that the block B2 that is next to be read needs the data of the block B1 to be attached on the left-hand side thereof as computation-purpose image data.

Figure 7:
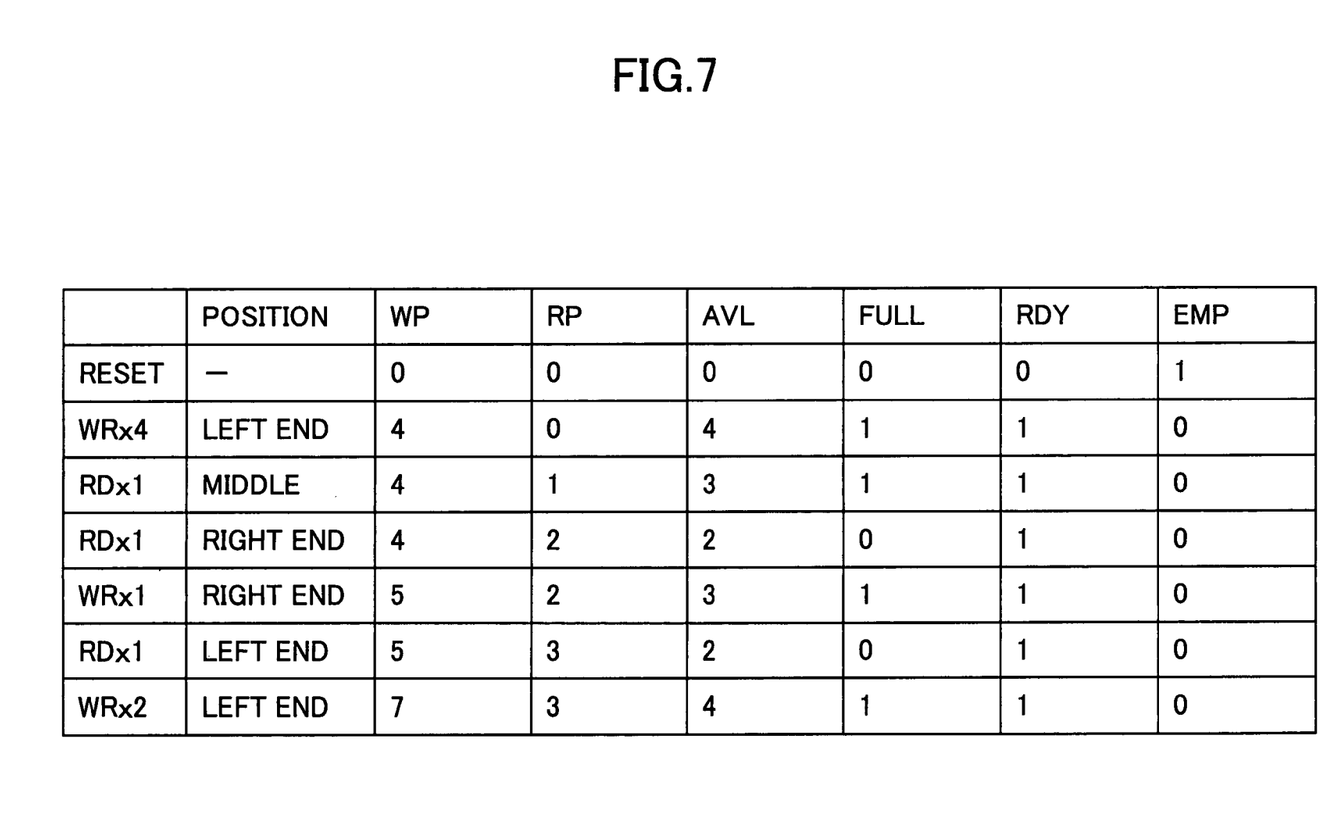
FIG. 7 is a drawing showing the way the parameters used for FIFO control by a FIFO control unit are changed.

In this manner, the image data buffer 31 of the present invention is characterized in that FIFO control by the FIFO control unit 38 is different from the normal FIFO control. FIG. 7 is a drawing showing the way the parameters used for the FIFO control by the FIFO control unit 38 are changed.

As shown in FIG. 7, the FIFO control unit 38 is provided with the write pointer WP, the read pointer RP, a valid-data number AVL, a write-permission-condition flag FULL, a read-permission-condition flag RDY, and an empty flag EMP indicating an empty data state. Rows starting with the "reset" row at the top correspond to the 7 respective conditions shown as the buffer data 51 through 57 in FIG. 6.

The valid-data number AVL indicates the number of data items that need to be read among the stored data (i.e., the number of data items that have not yet been read), and is computed as WP-RP. In this example, the FIFO has four stages, and is configured as a loop. It follows that if WP is at the first position, and RP is at the second position as shown in the buffer data 53 of FIG. 6, AVL is equal to 3 that is 1−2+4 ("4" represents one circle along the four-stage loop). Accordingly, AVL in the third row "RD×1" in FIG. 7 is shown as 3.

"Position" shown in FIG. 7 indicates the position information stored in the storage position indicated by the read pointer RP. As shown in FIG. 5, the position buffer 47 supplies to the FIFO control unit 38 the position information stored at the position indicated by the read pointer RP supplied from the FIFO control unit 38. The FIFO control unit 38 stores the position information supplied from the position buffer 47 as "position" in an internal register. Hereinafter, this "position" that is the content of the register is referred to as a position flag.

The write-permission-condition flag FULL assumes different values depending on whether this position flag indicates the left end (corresponding to "left" of the position information), the middle (corresponding to "middle" of the position information), or the right end (corresponding to "right" of the position information). If the write-permission-condition flag FULL is "1", it is not allowed to write the next data to the FIFO. If the write-permission-condition flag FULL is "0", it is allowed to write the next data to the FIFO.

With the position flag indicating the left end, FULL becomes "1" if AVL is equal to or greater than 4, and otherwise becomes "0". The reason for this is as follows. When the position flag indicates the left end, the data that is next to be read from the FIFO is a leftmost block. What is necessary as computation-purpose data is data of the adjacent block on the right. Due to the nature of the FIFO operation in which the first-written data is first to be erased, there is no circumstance under which the adjacent block on the right is erased before the block to be read. Further, data of the blocks written to the FIFO prior to the block to be read are no longer necessary. Accordingly, if AVL is 4 (i.e., the FIFO is filled with data that need to be read), FULL becomes "1" since the writing of next data to the FIFO is obviously not allowed. Otherwise, FULL becomes "0" so as to permit writing.

With the position flag indicating the middle, FULL becomes "1" if AVL is equal to or greater than 3, and otherwise becomes "0". The reason for this is as follows. When the position flag indicates the middle, the data that is next to be read from the FIFO is a middle block. What is necessary as computation-purpose data is data of the adjacent blocks on the left and right. Due to the nature of the FIFO operation in which the first-written data is first to be erased, there is no circumstance under which the adjacent block on the right is erased before the block to be read. Further, the data of the block that was written to the FIFO immediately before the data to be read is necessary, but the data of the further preceding blocks are no longer necessary. If AVL is 3, what is erased next is the data of the block that was written to the FIFO immediately before the block to be read. Accordingly, if AVL is 3 (and 4 indicating the fully filled state), FULL becomes "1" since the writing of next data to the FIFO is not allowed. If AVL is smaller than 3, FULL becomes "0" so as to permit writing.

With the position flag indicating the right end, FULL becomes "1" if AVL is equal to or greater than 3, and otherwise becomes "0". The reason for this is as follows. When the position flag indicates the right end, the data that is next to be read from the FIFO is a rightmost block. Further, all that is necessary as computation-purpose data is the data of the adjacent block on the left, which is the data of the block written to the FIFO immediately before the block to be read. The data of the further preceding blocks are no longer necessary. If AVL is 3, what is erased next is the data of the block that was written to the FIFO immediately before the block to be read. Accordingly, if AVL is 3 (and 4 indicating the fully filled state), FULL becomes "1" since the writing of next data to the FIFO is not allowed. If AVL is smaller than 3, FULL becomes "0" so as to permit writing.

The read-permission-condition flag RDY also assumes different values depending on whether the position flag indicates the left end, the middle, or the right end. If the read-permission-condition flag RDY is "1", it is allowed to read the next data from the FIFO. If the read-permission-condition flag RDY is "0", it is not allowed to read the next data from the FIFO.

With the position flag indicating the left end, RDY becomes "1" if AVL is equal to or greater than 2, and otherwise becomes "0". The reason for this is as follows. When the position flag indicates the left end, the data that is next to be read from the FIFO is a leftmost block. In this case, all that is necessary as computation-purpose data is data of the adjacent block on the right. Accordingly, if the write pointer WP has advanced at least two positions ahead of the read pointer RP by writing the adjacent block on the right, it is ready to read the block indicated by the read pointer RP.

With the position flag indicating the middle, RDY becomes "1" if AVL is equal to or greater than 2, and otherwise becomes "0". The reason for this is as follows. When the position flag indicates the middle, the data that is next to be read from the FIFO is a middle block. In this case, what is necessary as computation-purpose data is data of the adjacent blocks on the left and right. Since blocks are written to the FIFO in the order with the leftmost block first, the adjacent block on the left is obviously already stored in the FIFO. Accordingly, if the write pointer WP has advanced at least two positions ahead of the read pointer RP by writing the adjacent block on the right, it is ready to read the block indicated by the read pointer RP.

With the position flag indicating the right end, RDY becomes "1" if AVL is equal to or greater than 1, and otherwise becomes "0". The reason for this is as follows. When the position flag indicates the right end, the data that is next to be read from the FIFO is a rightmost block. In this case, all that is necessary as computation-purpose data is data of the adjacent block on the left. Since blocks are written to the FIFO in the order with the leftmost block first, the adjacent block on the left is obviously already stored in the FIFO. Accordingly, if the write pointer WP has advanced at least one position ahead of the read pointer RP by writing the block to be read, it is ready to read the block indicated by the read pointer RP.

By referring to the write-permission-condition flag FULL and the read-permission-condition flag RDY determined as described above, the controller 33 controls data write and data read operations with respect to the image data buffer 31. Namely, a data write operation is performed when the write-permission-condition flag FULL permits writing, and is not performed when the write-permission-condition flag FULL does not permit writing. Further, a data read operation is performed when the read-permission-condition flag RDY permits reading, and is not performed when the read-permission-condition flag RDY does not permit reading. With this arrangement, it is possible to perform the writing/reading of block data as shown as the buffer data 51 through 57 illustrated in FIG. 6, for example, thereby reliably supplying block data with attached computation-purpose data without losing the computation-purpose data that needs to be attached to each block.

Figure 8:
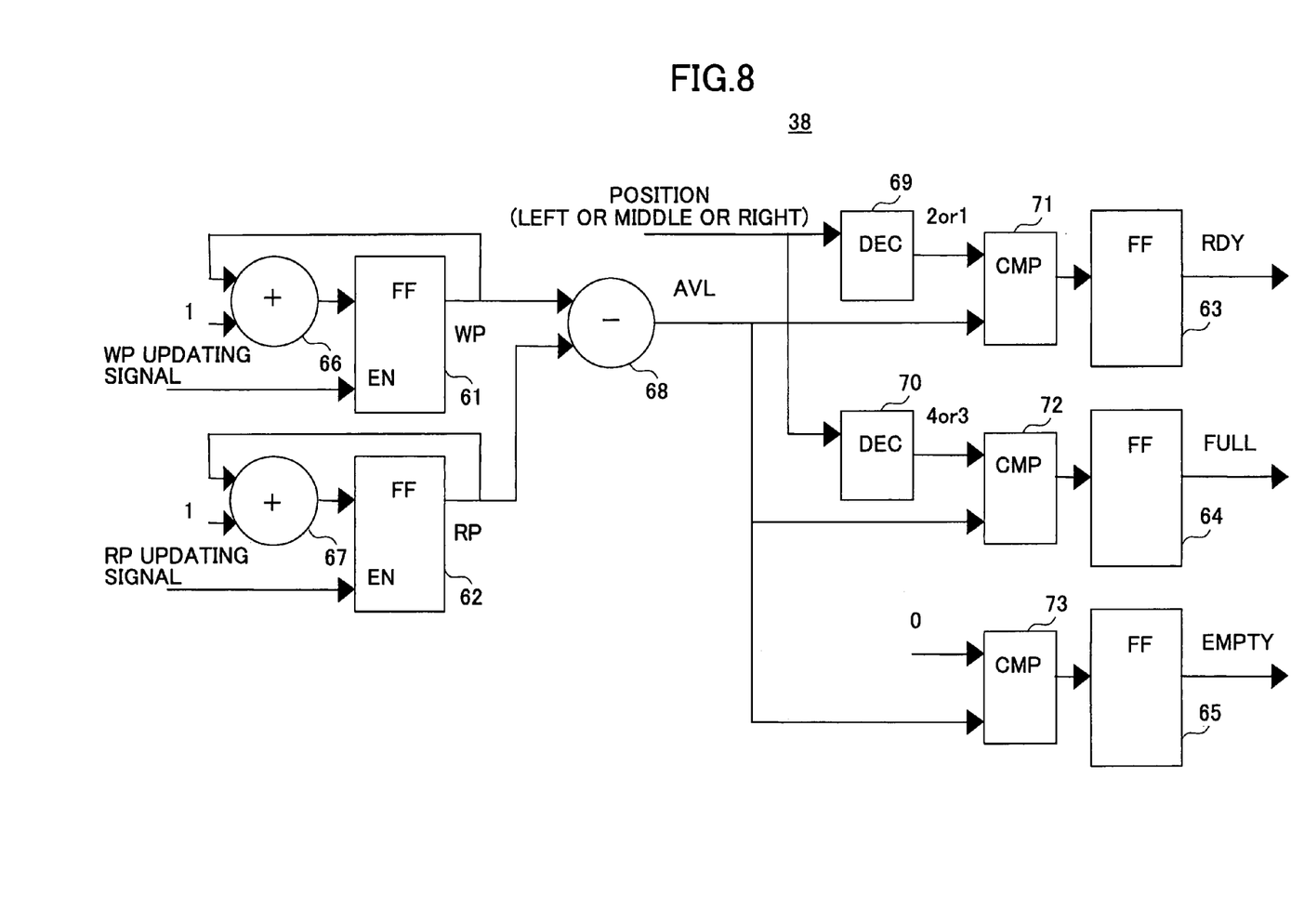
FIG. 8 is a drawing showing an example of the configuration of the FIFO control unit.

FIG. 8 is a drawing showing an example of the configuration of the FIFO control unit 38. The FIFO control unit 38 of FIG. 8 includes flip-flops 61 through 65, adders 66 and 67, a subtraction unit 68, decoders 69 and 70, and comparators 71 through 73.

The flip-flop 61 serves to store the write pointer WP. The flip-flop 61 latches the current value of the write pointer WP plus "1" added by the adder 66 in response to a write-pointer-WP updating signal supplied from the block counter 45.

The flip-flop 62 serves to store the read pointer RP. The flip-flop 62 latches the current value of the read pointer RP plus "1" added by the adder 67 in response to a read-pointer-RP updating signal supplied from the block counter 46. Provision may be made such that the flip-flops 61 and 62 are reset when the value indicated by the output thereof reaches the number of FIFO stages.

The subtraction unit 68 subtracts the value of the read pointer RP from the value of the write pointer WP so as to compute the valid-data number AVL. The obtained valid-data number AVL is supplied to one input of each of the comparators 71 through 73.

The other inputs of the comparators 71 through 73 receive the output of the decoder 69, the output of the decoder 70, and "0", respectively. The decoders 60 and 70 receive the position information (position flag) of the block to be read as indicated by the read pointer RP.

The decoder 69 decodes the position information so as to output "2" when the position information indicates "left" or "middle" and output "1" when the position information indicates "right". The comparator 71 asserts its output signal if AVL is greater than the output of the decoder 69. In response to the assertion of the output signal, the flip-flop 63 is set to "1".

The decoder 70 decodes the position information so as to output "4" when the position information indicates "left" and output "3" when the position information indicates "middle" or "right". The comparator 72 asserts its output signal if AVL is greater than the output of the decoder 70. In response to the assertion of the output signal, the flip-flop 64 is set to "1".

The comparator 73 asserts its output signal if AVL is greater than "0". In response to the assertion of the output signal, the flip-flop 65 is set to "1".

Figure 9:
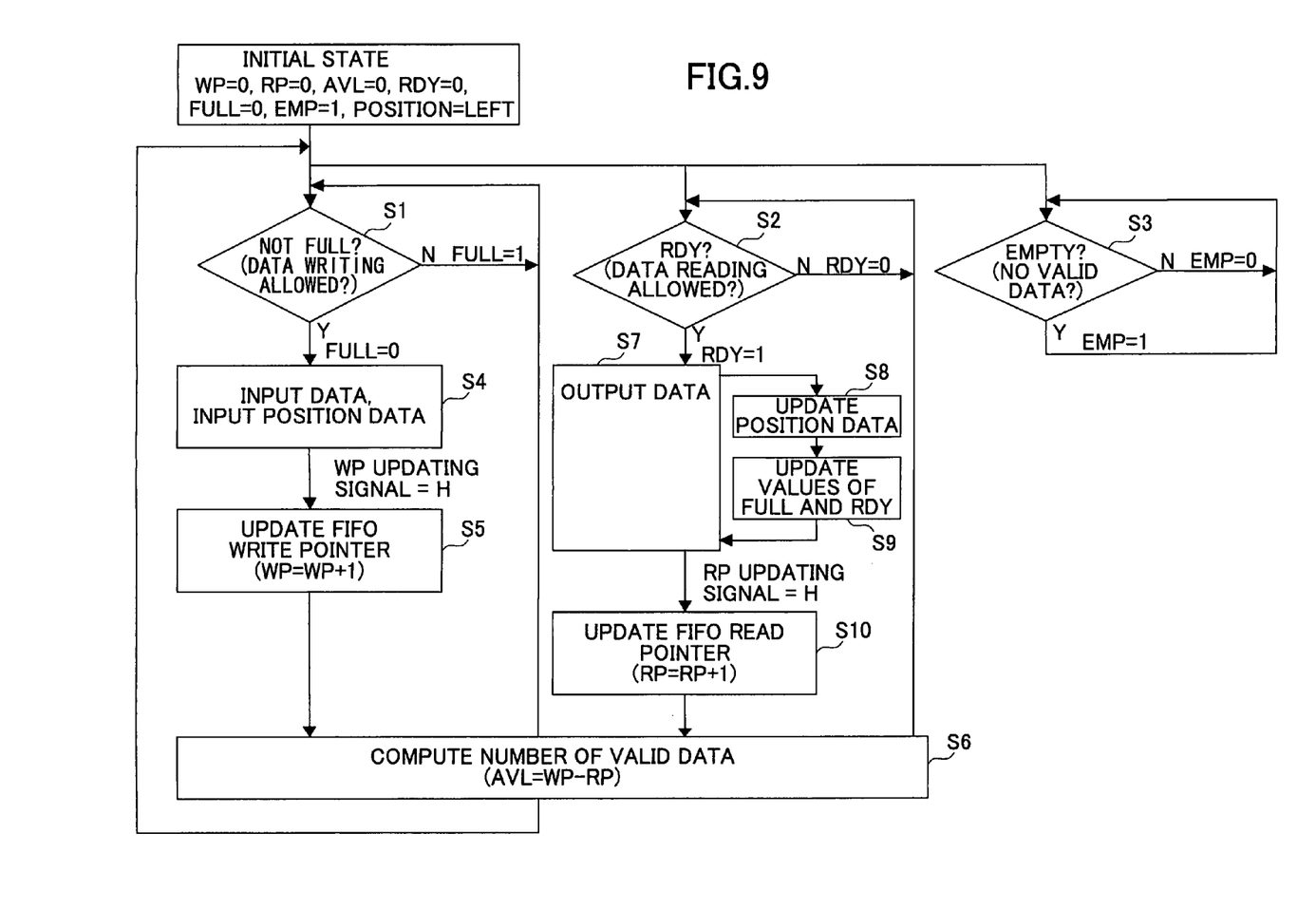
FIG. 9 is a flowchart showing an example of the operation of a controller and the image data buffer.

FIG. 9 is a flowchart showing an example of the operation of the controller 33 and the image data buffer 31.

In the initial state, all of the write pointer WP, the read pointer RP, the valid-data number AVL, the write-permission-condition flag FULL, and the read-permission-condition flag RDY are "0", and the empty flag EMP is "1", with the position flag being "left".

At step S1, a check is made as to whether FULL is "0". If FULL is "1", a check is made at step S2 as to whether RDY is "1". If FULL is "0", a check is made at step S3 as to whether EMP is "1". Operations performed after the checking of EMP have no relevance to the present invention, and are not shown. In FIG. 9, the procedure goes back to step S1 regardless of the value of EMP. The checks at steps S1 through S3 are performed by the controller 33.

If it is ascertained at step S1 that FULL is "0", data is input into the FIFO at step S4, and, also, the position data is input into the position buffer 47. Namely, the data of the next block is written to the RAM 37 at the address indicated by the write pointer WP under the control of the FIFO control unit 38 in response to a write instruction from the controller 33, and the position information regarding this block is stored in the position buffer 47 at the position indicated by the write pointer WP.

When the write-pointer-WP updating signal is asserted by the block counter 45, the write pointer WP is updated at step S5 in response thereto. At step S6, the valid-data number AVL is computed. After step S6, the procedure goes back to step S1.

If it is ascertained at step S2 that RDY is "1", data is output at step S7. Namely, the data of the block stored at the position indicated by the read pointer RP and the data of necessary portions on the left and right are read from the RAM 37 under the control of the FIFO control unit 38 in response to a read instruction from the controller 33, and are then supplied as output data to the image processing unit 32. At step S8, which is executed in parallel to step S7, the position data is updated. Namely, the content of the position flag stored in the FIFO control unit 38 is updated to the position information stored in the position buffer 47 indicated by the updated read pointer RP. At step S9, the values of FULL and RDY are updated.

When the read-pointer-RP updating signal is asserted by the block counter 46, the read pointer RP is updated at step S10 in response thereto. Namely, the read pointer RP is incremented in the FIFO control unit 38. At step S6, the valid-data number AVL is computed. After step S6, the procedure goes back to step S1.

As can be understood from the above description, at least one embodiment of the present invention avoids the duplicate transfer of the same data as much as possible during data transfer from the image memory to the FIFO, thereby providing an advantage in that the amount of data transfer is reduced. In the present invention, at least three stages need to be provided in the FIFO. In contrast, the number of stages needed in the FIFO is one in the conventional configuration. When a DRAM is used as an image memory, however, a conventional configuration generally uses a FIFO having three to four stages in order to ensure that the image processing unit can operate while access to the DRAM is not possible during the several thousand cycles necessary for a DRAM refresh operation. When the conventional configuration and the present invention are compared as having the same three-stage configuration, the size of the FIFO can be reduced in the present invention since the amount of image data for one block is smaller in the present invention.

Further, the present invention is not limited to these embodiments, but various variations and modifications may be made without departing from the scope of the present invention.

What is claimed is:

1. An image data buffer apparatus, comprising:
    a memory; and
    a FIFO control unit configured to cause the memory to operate as a FIFO and having a write pointer indicative of a write position of the memory and a read pointer indicative of a read position of the memory,
    wherein the FIFO control unit is configured to store image data as a plurality of blocks in the memory at respective positions successively indicated by the write pointer as the image data are supplied as the plurality of blocks contained in an image, to read a given one of the plurality of blocks from the memory at a position indicated by the read pointer, to read, from the memory, partial data that is only part and not all of at least one of the plurality of blocks immediately next to the given one of the plurality of blocks, and to output the given one of the plurality of blocks and the partial data together as one consolidated block, the partial data being a right-hand edge portion or left-hand edge portion of a two-dimensional image corresponding to the at least one of the plurality of blocks, and
    wherein the FIFO control unit is configured to read an entirety of the at least one block including the partial data before or after said reading of the partial data, thereby reading the partial data of the at least one block twice, without reading a remaining portion of the at least one block twice, the remaining portion plus the partial data being equal to an entirety of the at least one block.

2. The image data buffer apparatus as claimed in claim 1, further comprising a position buffer configured to store position information separately for each one of the plurality of blocks, the position information indicating a position of a block in the image, wherein the FIFO control unit is configured to set a value to a first flag in response to the number of blocks stored in the memory that are not yet read and the position information of the block indicated by the read pointer, the first flag indicating whether data reading is allowed.

3. The image data buffer apparatus as claimed in claim 2, wherein the FIFO control unit is configured to set a value to a second flag in response to the number of blocks stored in the memory that are not yet read and the position information of the block indicated by the read pointer, the second flag indicating whether data writing is allowed.

4. The image data buffer apparatus as claimed in claim 3, further comprising a controller configured to request data reading to the FIFO control unit in response to the value of the first flag and to request data writing to the FIFO control unit in response to the value of the second flag.

5. The image data buffer apparatus as claimed in claim 2, further comprising a block counter configured to count an amount of the supplied image data and to generate the position information in response to a comparison of the counted data amount with a block size.

6. The image data buffer apparatus as claimed in claim 5, wherein the position buffer is configured to store the position information supplied from the block counter at a position indicated by the write pointer supplied from the FIFO control unit.

7. The image data buffer apparatus as claimed in claim 6, wherein the position buffer is configured to supply to the FIFO control unit the position information stored at a position indicated by the read pointer supplied from the FIFO control unit.

8. An image transfer/processing system, comprising:
    a memory;
    a FIFO control unit configured to cause the memory to operate as a FIFO and having a write pointer indicative of a write position of the memory and a read pointer indicative of a read position of the memory; and
    an image processing unit,
    wherein the FIFO control unit is configured to store image data as a plurality of blocks in the memory at respective positions successively indicated by the write pointer as the image data are supplied as the plurality of blocks contained in an image, to read a given one of the plurality of blocks from the memory at a position indicated by the read pointer, to read, from the memory, partial data that is only part and not all of at least one of the plurality of blocks immediately next to the given one of the plurality of blocks, and to output the given one of the plurality of blocks and the partial data together to the image processing unit as one consolidated block, the partial data being a right-hand edge portion or left-hand edge portion of a two-dimensional image corresponding to the at least one of the plurality of blocks, and wherein the FIFO control unit is configured to read an entirety of the at least one block including the partial data before or after said reading of the partial data, thereby reading the partial data of the at least one block twice, without reading a remaining portion of the at least one block twice, the remaining portion plus the partial data being equal to an entirety of the at least one block.

9. The image transfer/processing system as claimed in claim 8, further comprising a position buffer configured to store position information separately for each one of the plurality of blocks, the position information indicating a position of a block in the image, wherein the FIFO control unit is configured to set a value to a first flag in response to the number of blocks stored in the memory that are not yet read and the position information of the block indicated by the read pointer, the first flag indicating whether data reading is allowed.

10. The image transfer/processing system as claimed in claim 9, wherein the FIFO control unit is configured to set a value to a second flag in response to the number of blocks stored in the memory that are not yet read and the position information of the block indicated by the read pointer, the second flag indicating whether data writing is allowed.

* * * * *